United States Patent
Stratten

(10) Patent No.: US 7,654,600 B2
(45) Date of Patent: Feb. 2, 2010

(54) VEHICLE TAILGATE MOVEMENT ASSIST MECHANISM USING LEVER DRIVEN ROTARY DAMPER

(75) Inventor: Eric L. Stratten, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 295 days.

(21) Appl. No.: 11/756,195

(22) Filed: May 31, 2007

(65) Prior Publication Data
US 2008/0197651 A1 Aug. 21, 2008

Related U.S. Application Data

(60) Provisional application No. 60/890,720, filed on Feb. 20, 2007.

(51) Int. Cl.
*B60P 1/267* (2006.01)
(52) U.S. Cl. .................................. 296/50; 296/57.1
(58) Field of Classification Search ............ 296/50, 296/56, 26.08, 146.4, 26.11, 57.1, 51; 49/386; 292/201, 216
See application file for complete search history.

(56) References Cited

U.S. PATENT DOCUMENTS

| | | | | |
|---|---|---|---|---|
| 2,589,872 A | * | 3/1952 | Schetky | 298/23 R |
| 2,626,067 A | * | 1/1953 | Berford et al. | 414/557 |
| 3,883,014 A | | 5/1975 | Glomski et al. | |
| 3,977,718 A | * | 8/1976 | Nordberg | 296/57.1 |
| 4,079,988 A | * | 3/1978 | Randall | 296/57.1 |
| 4,898,510 A | * | 2/1990 | Weber | 414/557 |
| 5,234,249 A | * | 8/1993 | Dorrell | 296/57.1 |
| 5,271,652 A | * | 12/1993 | Watanabe et al. | 296/57.1 |
| 5,449,212 A | * | 9/1995 | Seifert | 296/57.1 |
| 6,068,321 A | * | 5/2000 | Ooms | 296/57.1 |
| 6,206,444 B1 | * | 3/2001 | Casey | 296/50 |
| 6,217,097 B1 | * | 4/2001 | Rogers et al. | 296/57.1 |
| 6,241,300 B1 | * | 6/2001 | Suzuki | 296/37.8 |
| 6,357,813 B1 | * | 3/2002 | Vandeberghe et al. | 296/57.1 |
| 6,719,349 B2 | * | 4/2004 | Moyna | 296/50 |
| 6,773,047 B2 | | 8/2004 | Gruber | |
| 6,857,679 B2 | * | 2/2005 | Zagaroff | 296/57.1 |
| 6,877,791 B2 | | 4/2005 | Greuel et al. | |
| 7,063,373 B2 | | 6/2006 | Chikata et al. | |
| 7,093,876 B2 | * | 8/2006 | Romig et al. | 296/50 |
| 7,147,260 B2 | * | 12/2006 | Eschebach et al. | 296/57.1 |

(Continued)

*Primary Examiner*—Kiran B. Patel
(74) *Attorney, Agent, or Firm*—Gregory Brown; Price, Heneveld, Cooper, DeWitt & Litton, LLP

(57) ABSTRACT

A vehicle tailgate movement assist mechanism including a tailgate configured to rotate between opened and closed positions, and a tailgate lever arm fixedly connected to a bottom area of the tailgate. A drive lever may be pivotally connected to the lever arm and to a bell crank at opposite ends thereof. The bell crank may be connected to a shaft of a rotary gear pivotally anchored to a vehicle body. A rotary damper may be anchored to the vehicle body and include a damper gear connected to a shaft thereof. The damper gear may be rotatably meshed with the rotary gear. Rotation of the tailgate from a closed to an opened position simultaneously rotates the lever arm to move the drive lever and the bell crank to thereby rotate the rotary gear which rotates the damper gear to actuate the rotary damper to reduce an opening speed of the tailgate.

15 Claims, 11 Drawing Sheets

U.S. PATENT DOCUMENTS 7,156,447 B2 1/2007 Watanabe
7,533,920 B2 * 5/2009 Ohly .......................... 296/57.1

2006/0202500 A1 * 9/2006 Eschebach et al. ......... 296/57.1

* cited by examiner

VEHICLE TAILGATE MOVEMENT ASSIST MECHANISM USING LEVER DRIVEN ROTARY DAMPER

RELATED APPLICATIONS

This application claims benefit of priority of Provisional Application Ser. No. 60/890,720, filed Feb. 20, 2007, hereby incorporated by reference in its entirety.

BACKGROUND OF INVENTION a. Field of Invention

The invention relates generally to pivotable closure assemblies, such as tailgates, for pick up trucks, SUVs and other such vehicles, and more particularly, to a tailgate assembly which is capable of being opened and closed in an assisted manner and with a controlled velocity.

b. Description of Related Art

As is known in the art, pick up trucks, SUVs and other such vehicles generally include a tailgate having a variety of components for facilitating or limiting movement of the tailgate. For example, referring to FIGS. 1 and 2, a typical pick up truck 10 is illustrated including a tailgate 12 whose movement in the tailgate opening direction is controlled by tailgate pivot brackets 14. For conventional tailgates such as tailgate 12 of FIGS. 1 and 2, when the tailgate is moved from its closed position of FIG. 1 to its open position of FIG. 2, the tailgate generally pivots open under the force of gravity or with limited resistance by a torsion rod until pivotal movement thereof is stopped by brackets or cables 14. As readily evident, this pivotal movement is generally uncontrolled as the tailgate abruptly stops upon reaching its open horizontal position of FIG. 2. If the tailgate is inadvertently left in this open position during movement of the vehicle, the tailgate may bounce uncontrolled and thus prematurely damage the tailgate or its associated components.

Likewise, when tailgate 12 is moved from its open position of FIG. 2 to its closed position of FIG. 1, a user can often lift the tailgate with a force sufficient to lift the tailgate but insufficient for fully engage the tailgate's latching mechanism, thus requiring a second attempt to fully latch the tailgate. This is generally because the user must first lift the tailgate from its horizontal resting position, and once the tailgate is in motion, the user applies a lesser force to the tailgate as the force required to continue the closing motion is less than the initial force required to lift the tailgate.

In an effort to address the aforementioned drawbacks of conventional tailgates, a variety of mechanisms have been proposed for assisting with the tailgate closing function, as well as for controlling the tailgate opening velocity.

One such exemplary design for assisting with the tailgate closing function is disclosed in U.S. Pat. No. 6,773,047 to Gruber. Specifically, referring to FIGS. 4 and 5 of Gruber, there disclosed a vehicle tailgate lift system including an energy storage device (10) located within a vehicle body adjacent the D-pillar and pivotally anchored to the vehicle body. A bellcrank arm (13) is pivotally attached to energy storage device (10) and rigidly attached to an actuation shaft (14; see FIG. 2) that is coaxially aligned with tailgate (2) and its pivot axis. As tailgate (2) is moved from its open position of FIG. 4 to its closed position of FIGS. 1 and 5, stored energy in device (10) at the tailgate open position is released to assist with the tailgate closing function.

While the tailgate lift system of Gruber provides adequate lift assistance, the mechanism nevertheless has several drawbacks related to packaging, operation and adjustability thereof. For example, referring to FIGS. 4 and 5 of Gruber, the Gruber tailgate lift system includes a relatively long energy storage device (10) and similarly long bellcrank arm (13) for generating an adequate moment for rotating tailgate (2), with device (10) being pivotally mounted to the side wall in the D-pillar area. As readily evident, the size of device (10) and bellcrank arm (13) require these components to be installed in the D-pillar area, which is itself limited in space due to the structural rigidity and performance requirements for this area. Since energy storage device (10) provides the primary force for assisting with movement of tailgate (2), adjustability in the opening or closing movement of tailgate (2) is limited to the operational parameters of device (10), which as discussed above, can itself in conjunction with bellcrank arm (13) be a design drawback due to the large size thereof.

Another exemplary design for assisting with a tailgate opening/closing function is disclosed in U.S. Pat. No. 5,271,652 to Watanabe. Specifically, referring to FIGS. 1-3 of Watanabe, there disclosed a device for applying an auxiliary force to a loading deck side plate (13). The device includes a spring (20) for pulling rod (21) attached to an intermediate link (25), with link (25) being connected to a swing link (16) connected to side plate (13). As with the lift assist device of Gruber, while the Watanabe device functions to assist with the opening and closing of side plate (13), the device nevertheless is incapable of a smooth opening/closing operation due to the fact that swing link (16) abruptly rotates during opening or closing of side plate (13) as illustrated in the FIGS. 1-3, and is therefore undesirable for use as a tailgate assist device.

Yet further, another exemplary design for assisting with a tailgate opening/closing function is disclosed in U.S. Pat. No. 6,217,097 to Rogers. Referring to FIG. 1-4 of Rogers, there is disclosed a power operated tailgate (12) which includes motor (36) for operating gear (37) which drives larger diameter sector gear (26) to move support link (30) connected to tailgate (14). As shown in FIG. 2, support link (30) protrudes through slot (33), whereby a user can clearly see operation of the mechanism, and the mechanism is susceptible to contamination. Moreover, based on the design as illustrated in FIG. 2, the mechanism clearly requires a substantial amount of space in the area of the vehicle D-pillar.

It is therefore desirable to provide a vehicle tailgate movement assist mechanism which may be installed adjacent the vehicle D-pillar, or along the width of the vehicle bed, without significantly impacting the space required for other structural components, or without being visible to a user. It is also desirable to provide a vehicle tailgate movement assist mechanism which is capable of being readily tuned and adjusted to a user's operational parameters, which includes a minimal number of components for thus simplifying the manufacturing and assembly steps required for such components, and which provides a smooth opening or closing assist operation.

SUMMARY OF THE INVENTION

The invention solves the problems and overcomes the drawbacks and deficiencies of prior art vehicle tailgate opening and closing assist devices by providing a vehicle tailgate movement assist mechanism including a tailgate configured to rotate between opened and closed positions, and a tailgate lever arm fixedly connected to a bottom area of the tailgate. A drive lever may be pivotally connected at one end thereof to the tailgate lever arm and pivotally connected at an opposite end thereof to a bell crank. The bell crank may be connected to a shaft of a rotary gear pivotally anchored to a vehicle body, and a rotary damper may be anchored to the vehicle body and include a damper gear connected to a shaft thereof. The damper gear may be rotatably meshed with the rotary gear. With the mechanism configured as discussed above, rotation of the tailgate from a closed to an opened position simultaneously rotates the tailgate lever arm to impart movement to the drive lever and the bell crank to thereby rotate the rotary gear which rotates the damper gear to actuate the rotary damper to reduce an opening speed of the tailgate.

For the vehicle tailgate movement assist mechanism described above, rotation of the tailgate from an opened to a closed position simultaneously rotates the tailgate lever arm to impart movement to the drive lever and the bell crank to thereby rotate the rotary gear which rotates the damper gear to actuate the rotary damper to assist with closing of the tailgate. In a particular embodiment, the rotary damper may be anchored to a vehicle rear sill. The mechanism may partially protrude through a cutout in the vehicle rear sill. Further, the mechanism may be disposed adjacent a vehicle D-pillar, or alternatively, the mechanism may be disposed at an intermediate location along a width of the tailgate. Moreover, the drive lever, bell crank, rotary gear and rotary damper may be disposed generally within the vehicle rear sill.

The invention also provides a vehicle tailgate movement assist mechanism including a tailgate configured to rotate between opened and closed positions, and a tailgate lever arm fixedly connected to a bottom area of the tailgate. A drive lever may be pivotally connected at one end thereof to the tailgate lever arm and pivotally connected at an opposite end thereof to a bell crank. The bell crank may be connected to a shaft of a rotary damper anchored to a vehicle body. With the mechanism as configured above, rotation of the tailgate from a closed to an opened position simultaneously rotates the tailgate lever arm to impart movement to the drive lever and the bell crank to thereby actuate the rotary damper to reduce an opening speed of the tailgate.

For the vehicle tailgate movement assist mechanism described above, rotation of the tailgate from an opened to a closed position simultaneously rotates the tailgate lever arm to impart movement to the drive lever and the bell crank to thereby actuate the rotary damper to assist with closing of the tailgate. As discussed above, the rotary damper may be anchored to a vehicle rear sill, and the mechanism may partially protrude through a cutout in the vehicle rear sill. In a particular embodiment, the mechanism may be disposed adjacent a vehicle D-pillar, or alternatively, the mechanism may be disposed at an intermediate location along a width of the tailgate. Moreover, the drive lever, bell crank, rotary gear and rotary damper may be disposed generally within the vehicle rear sill.

The invention yet further provides a vehicle tailgate movement assist mechanism including a tailgate configured to rotate between opened and closed positions, and a tailgate lever arm fixedly connected to the tailgate. A drive lever may be pivotally connected at a first location thereof to the tailgate lever arm and pivotally connected at a second location thereof to a bell crank. The bell crank may be connected to a shaft of a rotary gear pivotally anchored to a vehicle body, and a rotary damper may be anchored to the vehicle body and include a damper gear connected to a shaft thereof. The damper gear may be rotatably meshed with the rotary gear. With the mechanism configured as discussed above, rotation of the tailgate from a closed to an opened position simultaneously rotates the tailgate lever arm to impart movement to the drive lever and the bell crank to thereby rotate the rotary gear which rotates the damper gear, and movement of the tailgate, the tailgate lever arm, the drive lever, the bell crank, the rotary gear and/or the damper gear may directly or indirectly cause actuation of the rotary damper to reduce an opening speed of the tailgate.

For the vehicle tailgate movement assist mechanism described above, rotation of the tailgate from an opened to a closed position simultaneously rotates the tailgate lever arm to impart movement to the drive lever and the bell crank to thereby rotate the rotary gear which rotates the damper gear, and movement of the tailgate, the tailgate lever arm, the drive lever, the bell crank, the rotary gear and/or the damper gear may directly or indirectly cause actuation of the rotary damper to assist with closing of the tailgate. As discussed above, in a particular embodiment, the rotary damper may be anchored to a vehicle rear sill, and the mechanism may partially protrude through a cutout in the vehicle rear sill. Further, the mechanism may be disposed adjacent a vehicle D-pillar, or alternatively, the mechanism may be disposed at an intermediate location along a width of the tailgate. Moreover, the drive lever, bell crank, rotary gear and rotary damper may be disposed generally within the vehicle rear sill.

The invention also provides a vehicle tailgate movement assist mechanism including a tailgate configured to rotate between opened and closed positions, and a tailgate lever arm fixedly connected to the tailgate. A drive lever may be pivotally connected at a first location thereof to the tailgate lever arm and pivotally connected at a second location thereof to a bell crank. The bell crank may be connected to a shaft of a rotary damper anchored to a vehicle body. With the mechanism as configured above, rotation of the tailgate from a closed to an opened position simultaneously rotates the tailgate lever arm to impart movement to the drive lever and the bell crank, and movement of the tailgate, the tailgate lever arm, the drive lever and/or the bell crank may directly or indirectly cause actuation of the rotary damper to reduce an opening speed of the tailgate.

For the vehicle tailgate movement assist mechanism described above, rotation of the tailgate from an opened to a closed position simultaneously rotates the tailgate lever arm to impart movement to the drive lever and the bell crank, and movement of the tailgate, the tailgate lever arm, the drive lever and/or the bell crank may directly or indirectly cause actuation of the rotary damper to assist with closing of the tailgate. As discussed above, the rotary damper may be anchored to a vehicle rear sill, and the mechanism may partially protrude through a cutout in the vehicle rear sill. In a particular embodiment, the mechanism may be disposed adjacent a vehicle D-pillar, or alternatively, the mechanism may be disposed at an intermediate location along a width of the tailgate. Moreover, the drive lever, bell crank, rotary gear and rotary damper may be disposed generally within the vehicle rear sill.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE PREFERRED EMBODIMENTS

Figure 1:
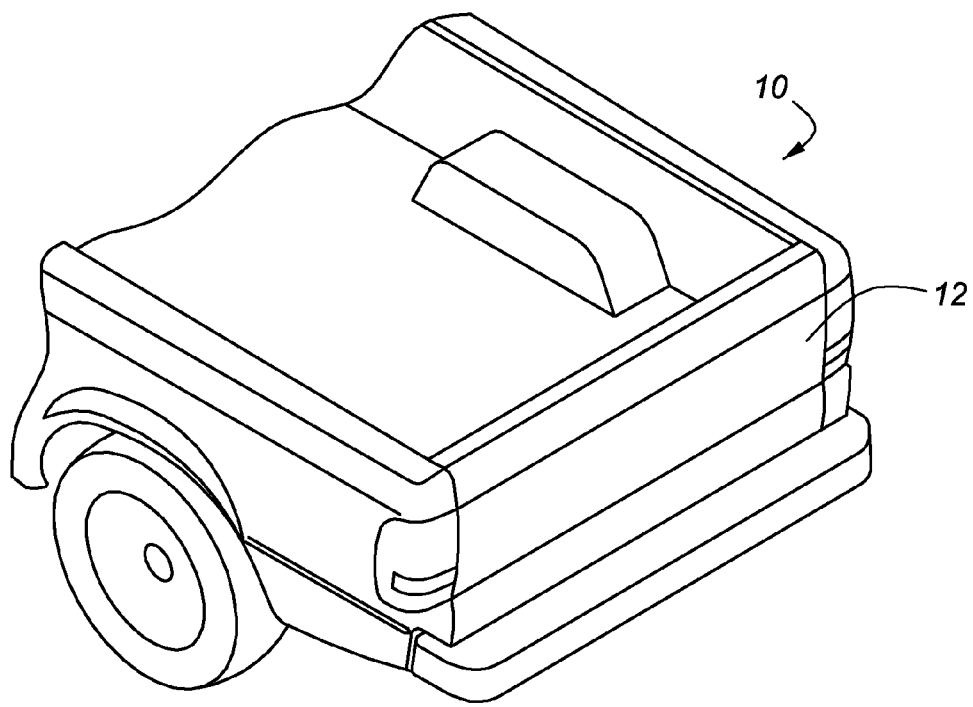
FIG. 1 is an isometric view of a pick up truck including a conventional tailgate pivot control mechanism, with the tailgate disposed in a closed configuration.

Referring now to the drawings wherein like reference numerals designate corresponding parts throughout the several views, FIGS. 3-7 illustrate various views of an embodiment of a vehicle tailgate opening and closing assist mechanism according to the present invention, the mechanism being hereinafter generally designated "tailgate movement assist mechanism 20," and FIGS. 8-11 illustrate another embodiment thereof, hereinafter generally designated "tailgate movement assist mechanism 60."

Figure 3:
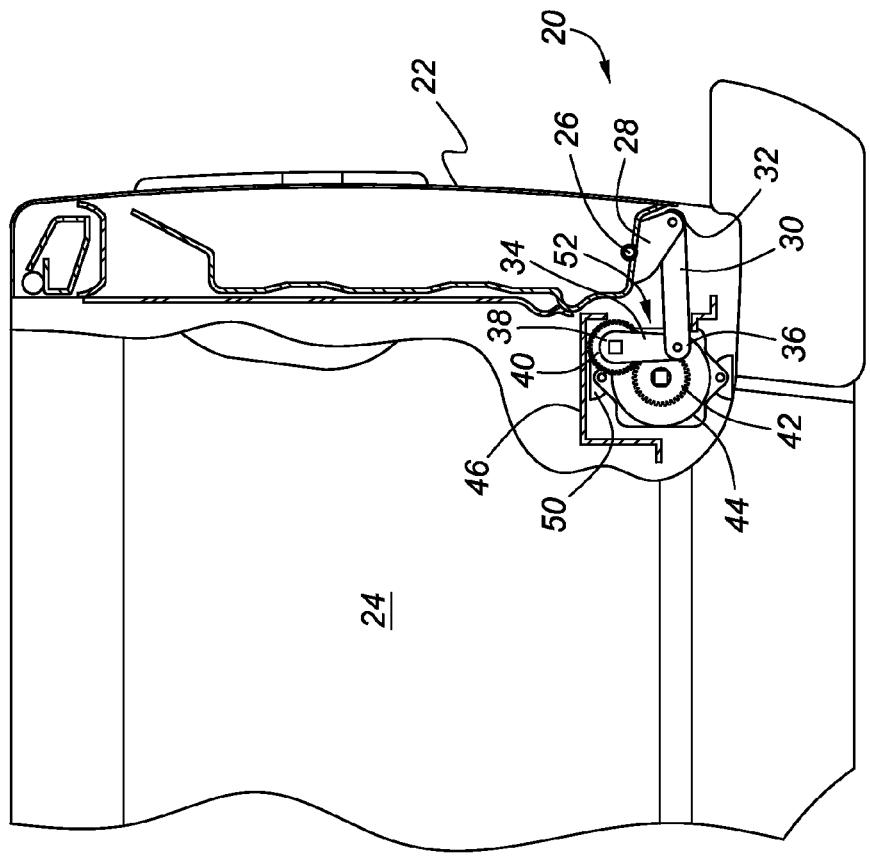
FIG. 3 is a side cutout view illustrative of an embodiment of a vehicle tailgate movement assist mechanism according to the present invention, illustrating the tailgate in a closed position.
Figure 4:
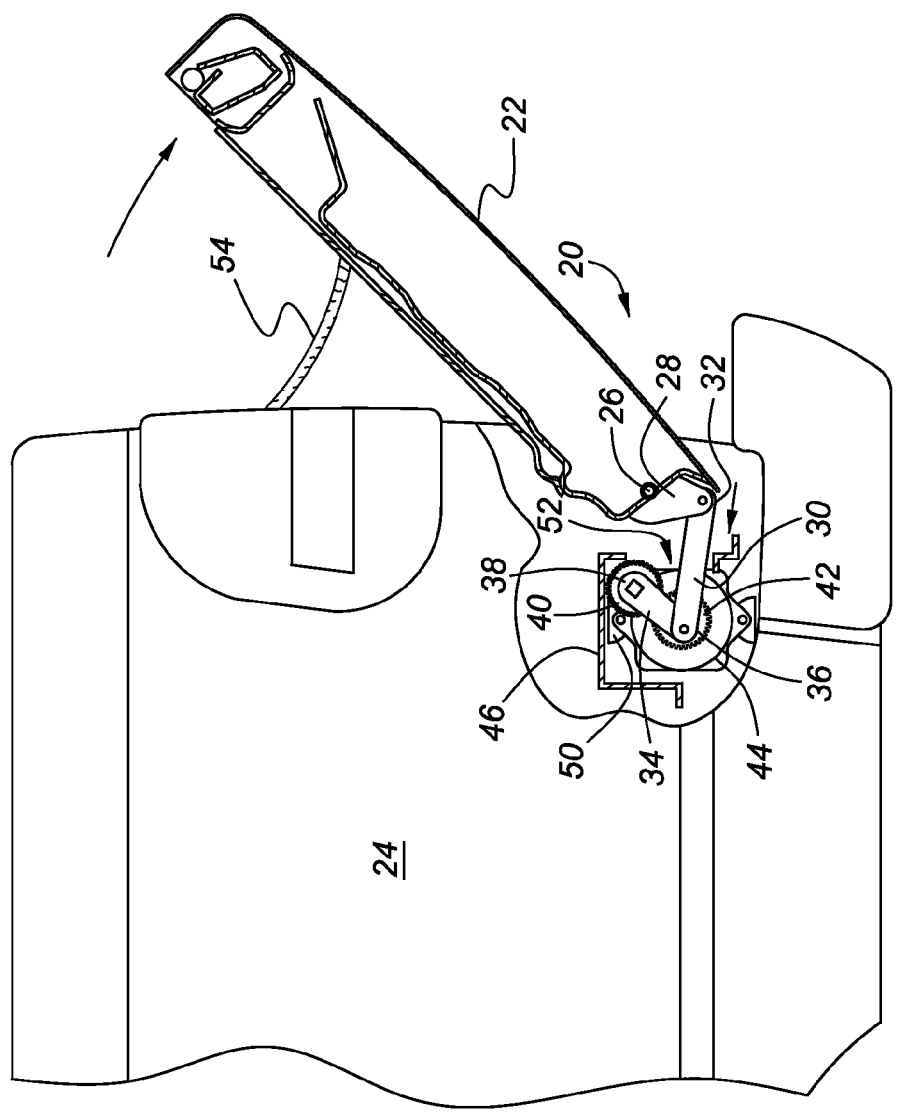
FIG. 4 is a side cutout view illustrative of the vehicle tailgate movement assist mechanism of FIG. 3, illustrating the tailgate at an approximately 45° angle.
Figure 5:
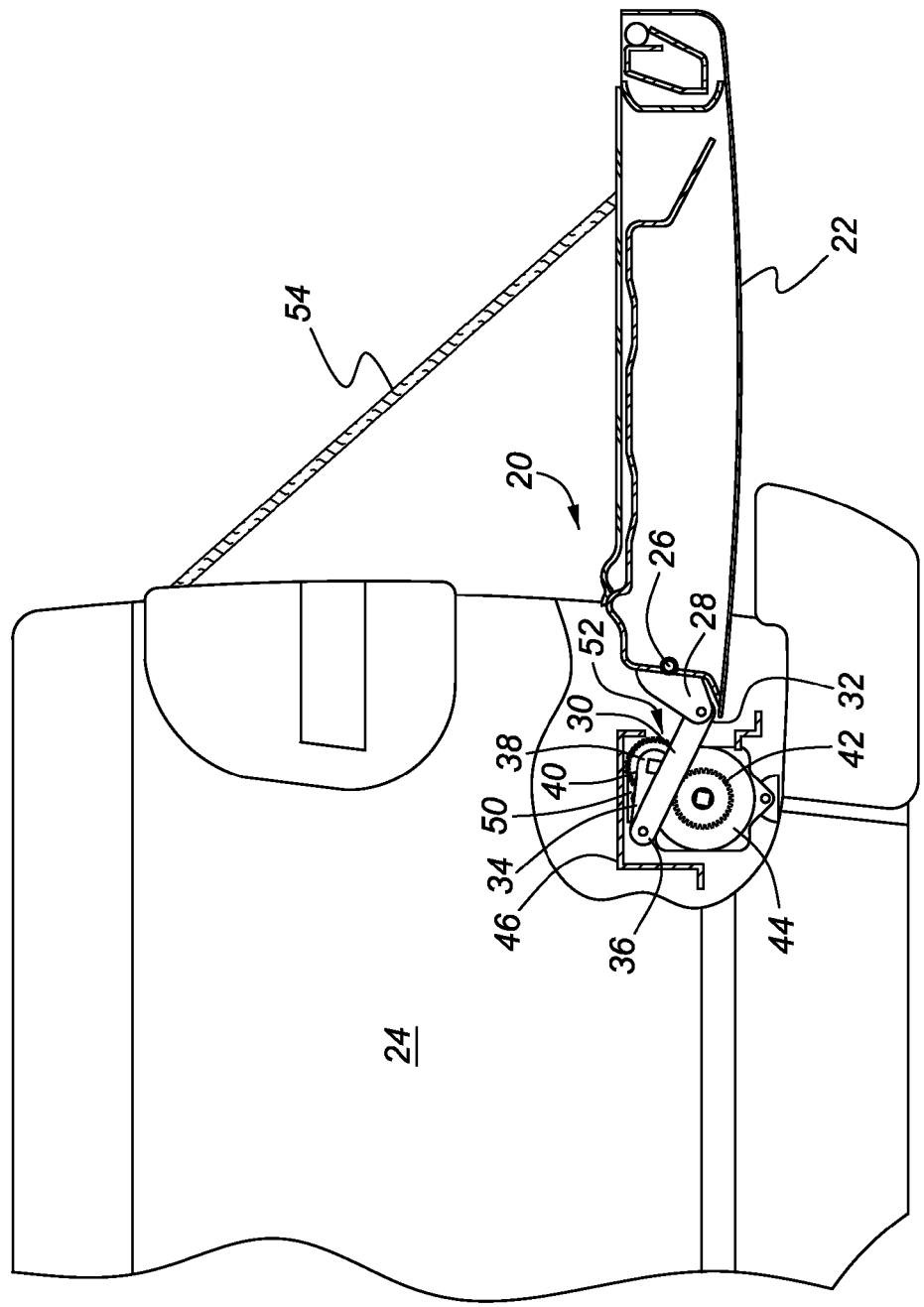
FIG. 5 is a side cutout view illustrative of the vehicle tailgate movement assist mechanism of FIG. 3, illustrating the tailgate in a fully open position.
Figure 6:
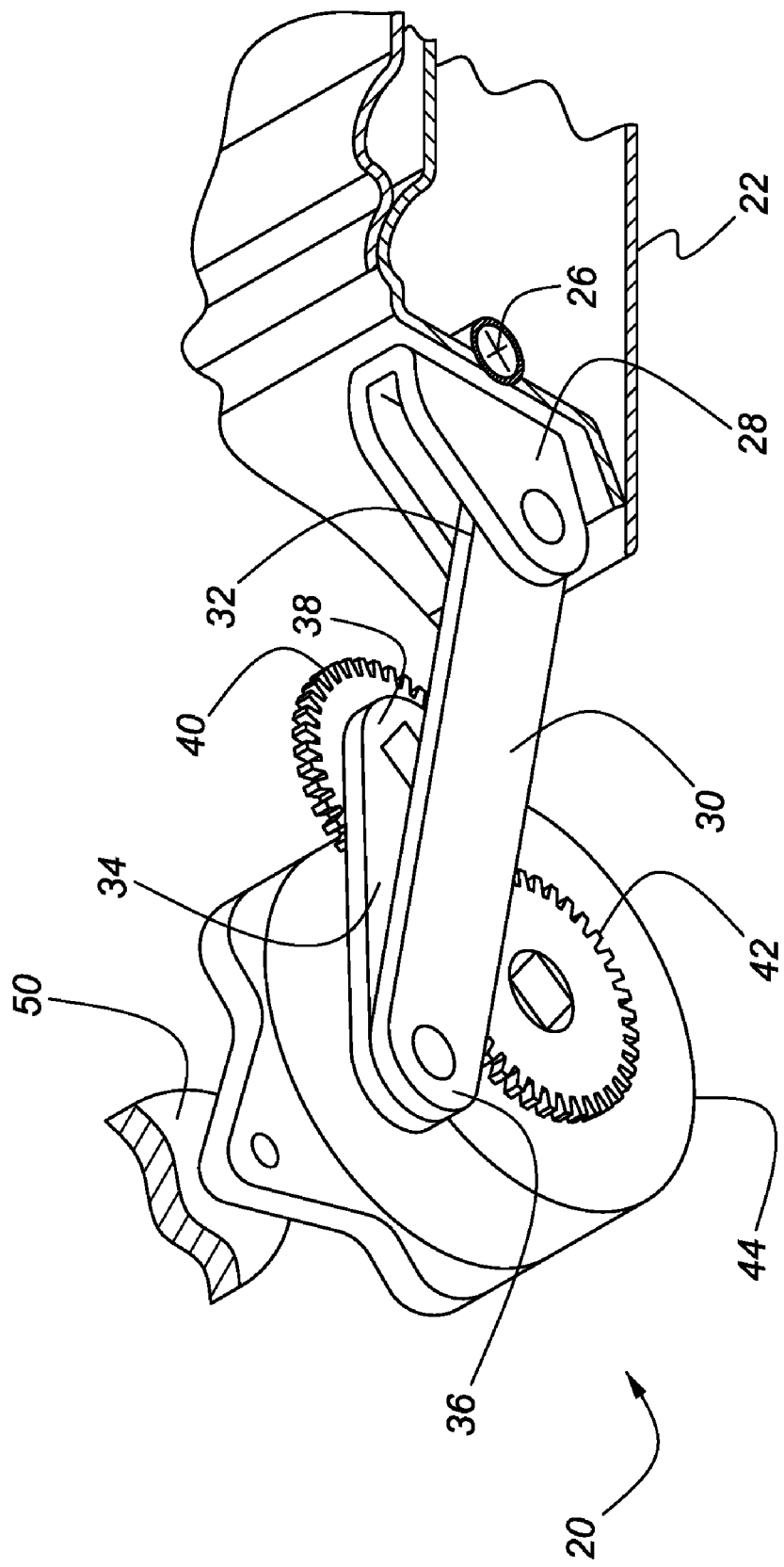
FIG. 6 is an isometric view of the components of the vehicle tailgate movement assist mechanism of FIG. 3.
Figure 7:
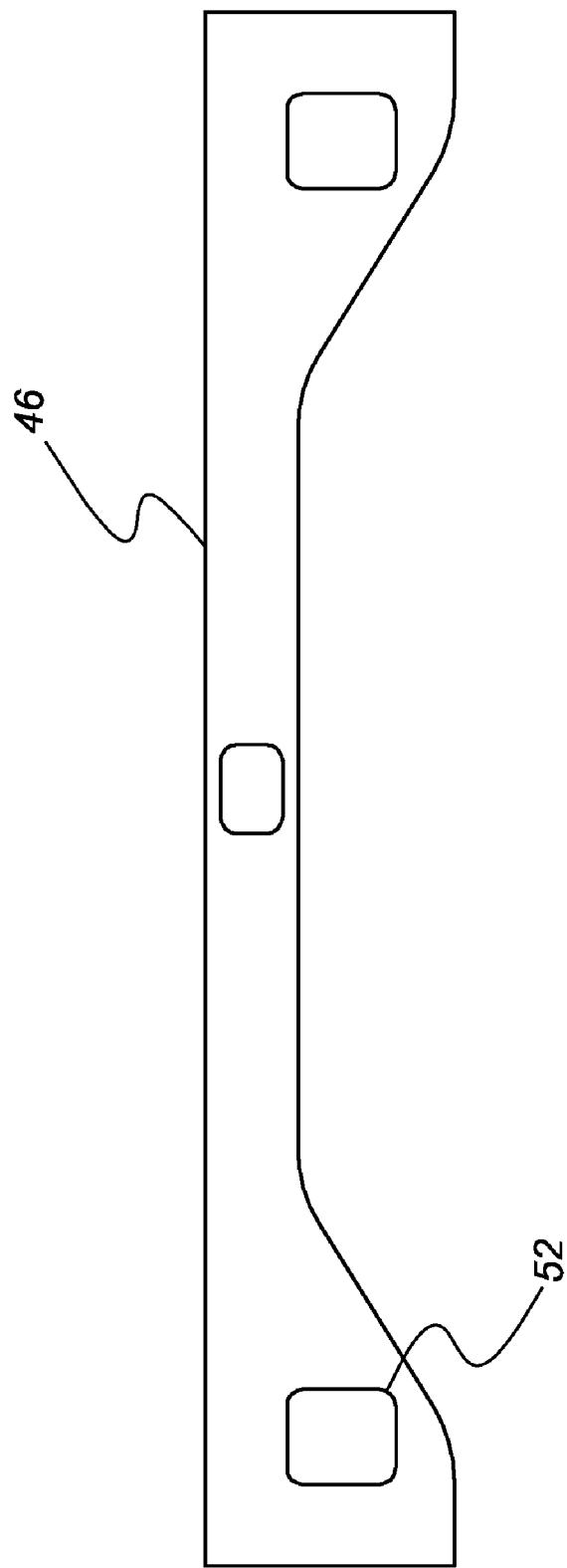
FIG. 7 is a view illustrative of a rear sill including exemplary cutouts for proper installation and operation of the vehicle tailgate movement assist mechanism of FIG. 3.

Referring to FIGS. 3-7, tailgate movement assist mechanism 20 may generally include a tailgate 22 pivotally mounted to vehicle side wall 24 at pivot point 26. A tailgate lever arm 28 may be fixedly mounted to tailgate 22 on the lower end thereof. A drive link 30 may be pivotally connected to tailgate lever arm 28 at end 32 thereof and to a bell crank 34 at opposite end 36 thereof. In the particular embodiment illustrated, drive link 30 may be disposed in a generally horizontal configuration in the tailgate closed position of FIG. 3. However, as discussed below, those skilled in the art would readily appreciate in view of this disclosure that link 30 may be disposed at a different angle as needed for adequate movement assist of tailgate 22. Bell crank 34 may include a first end 38 connected to a shaft (not shown) of gear 40 which may be pivotally anchored to a vehicle structural component such as side wall 24, or as shown, to a rear sill structural component 46 at location 48 thereof and disposed adjacent or between side walls 24. In this manner, if needed, mechanism 20 may be attached at a location between side walls 24 as opposed to in the area occupied by a vehicle D-pillar 39. Gear 40 may be rotatably meshed with a gear 42 driven by rotary damper 44 which may be anchored to a vehicle structural component such as side wall 24, or as shown, to rear sill structural component 46 at location 50 thereof and disposed adjacent or between side walls 24, depending on the anchored attachment of gear 40. Rotary damper 44 may provide damping to limit the opening velocity of tailgate 22 based on the corresponding angular velocity of rotation of the rotary damper shaft. In a similar manner, rotary damper 44 may be configured to provide lift assist to a user for closing of tailgate 22 by means of a concentrically disposed torsion rod (not shown), spring (not shown) or other means, which may be disposed internally or externally of damper 44. Rear sill structural component 46 may include a cut-out 52 for drive link 30, and as shown in FIG. 7 and as briefly discussed above, cut-outs 52 may be disposed adjacent side walls 24 or at an intermediate location between side walls 24. Further, as illustrated in FIGS. 4 and 5, a cable or tailgate pivot bracket 54 may be provided in a known manner for limiting rotation of tailgate 22 in its fully open direction, and for supporting the tailgate and any loads applied thereto by a user during normal use.

The operation of tailgate movement assist mechanism 20 will now be described in detail with reference to FIGS. 3-7.

Specifically, with tailgate 22 disposed in its fully upright and closed position of FIG. 3, a user may unlatch tailgate 22 in a known manner and pull tailgate 22 in the clock-wise direction in FIG. 3. As the user allows tailgate 22 to drop under its weight relative to pivot point 26, lever arm 28 may rotate in a clock-wise direction along with tailgate 22 to translate drive link 30 toward the left, which further rotates bell crank 34 in a clock-wise direction to actuate rotary damper 44. As tailgate 22 continues its clock-wise rotation about its pivot point 26 from the FIG. 3 to the FIG. 4 positions, actuation of the damping function of rotary damper 44 thus bring tailgate 22 to a "soft" stop as shown in FIG. 5. Moreover, if needed, the entire rotation of tailgate 22 from its closed position of FIG. 3 to its opened position of FIG. 5 may be controlled by means of the damping characteristics of rotary damper 44.

When tailgate 22 is lifted (i.e. rotated in a counter clock-wise direction in the FIG. 5 configuration) from its fully open position of FIG. 5 to its fully closed position of FIG. 3, rotary damper 44 may likewise actuate to assist the user with lifting and thereafter full closing of the tailgate. As discussed above with reference to the opening function of tailgate 22, the entire rotation of tailgate 22 from its opened position of FIG. 5 to its closed position of FIG. 3 may be controlled or assisted by means of rotary damper 44.

Referring next to FIGS. 8-11, another embodiment of the tailgate movement assist mechanism, designated tailgate movement assist mechanism 60, will now be described in detail.

Figure 9:
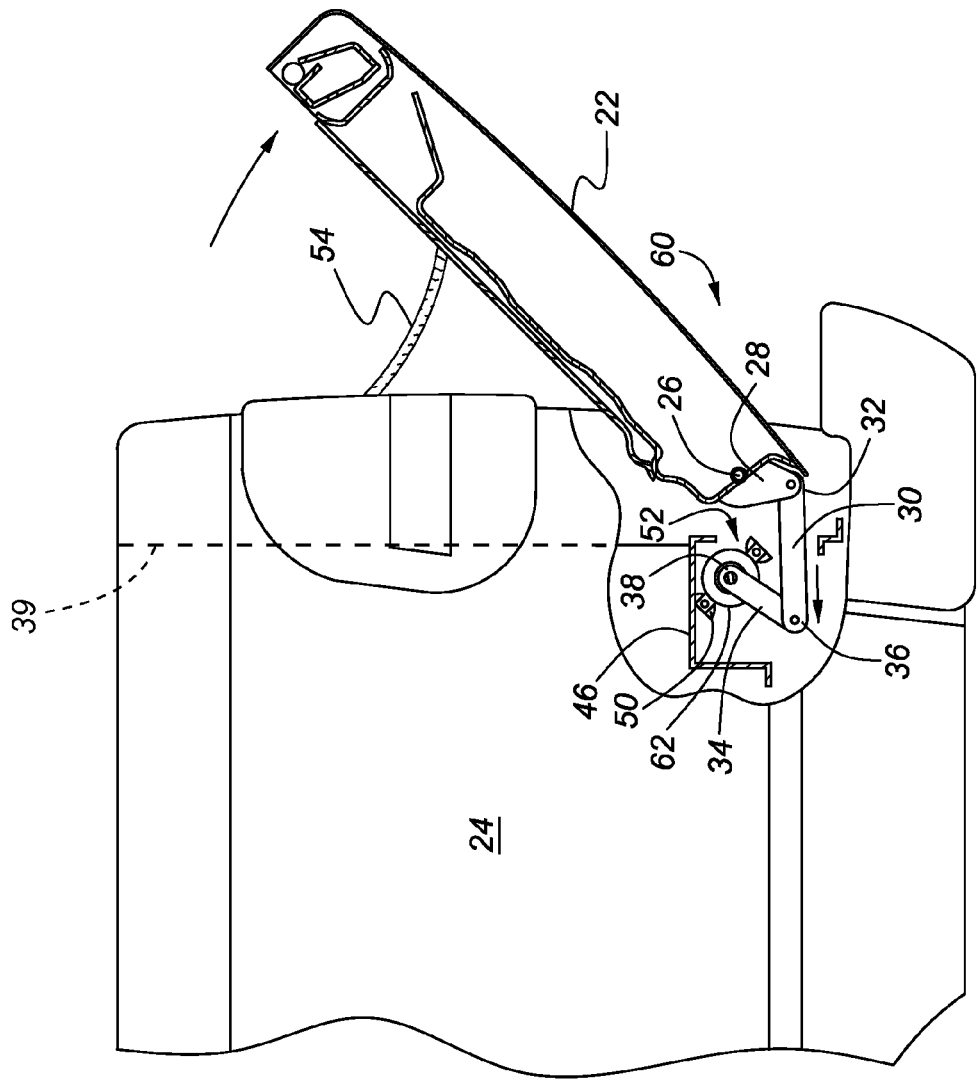
FIG. 9 is a side cutout view illustrative of the vehicle tailgate movement assist mechanism of FIG. 8, illustrating the tailgate at an approximately 45° angle.

Specifically, in a similar manner as tailgate movement assist mechanism 20, mechanism 60 may generally include tailgate 22 pivotally mounted to vehicle side wall 24 at pivot point 26, and tailgate lever arm 28 fixedly mounted to tailgate 22 on the lower end thereof. As with mechanism 20, drive link 30 may be pivotally connected to tailgate lever arm 28 at end 32 thereof and to bell crank 34 at opposite end 36 thereof. Bell crank 34 may include first end 38 connected to a shaft (not shown) of rotary damper 62 which may be anchored to a vehicle structural component such as side wall 24, or as shown, to a rear sill structural component 46 at location 48 thereof and disposed adjacent or between side walls 24. In this manner, if needed, mechanism 20 may be attached at a location between side walls 24 as opposed to in the area occupied by the vehicle D-pillar 39. Rotary damper 62 may provide damping to limit the opening velocity of tailgate 22 based on the corresponding angular velocity of rotation of the rotary damper shaft. In a similar manner, rotary damper 62 may be configured to provide lift assist to a user for closing of tailgate 22 by means of a concentrically disposed torsion rod (not shown), spring (not shown) or other means, which may be disposed internally or externally of damper 62. Rear sill structural component 46 may include a cut-out 52 for drive link 30, and as shown in FIG. 7 and as briefly discussed above, cut-outs 52 may be disposed adjacent side walls 24 or at an intermediate location between side walls 24. Further, as illustrated in FIGS. 9 and 10, a cable 54 or tailgate pivot bracket 55 may be provided in a known manner for limiting rotation of tailgate 22 in its fully open direction, and for supporting the tailgate and any loads applied thereto by a user during normal use.

The operation of tailgate movement assist mechanism 60 will now be described in detail with reference to FIGS. 8-11.

Figure 8:
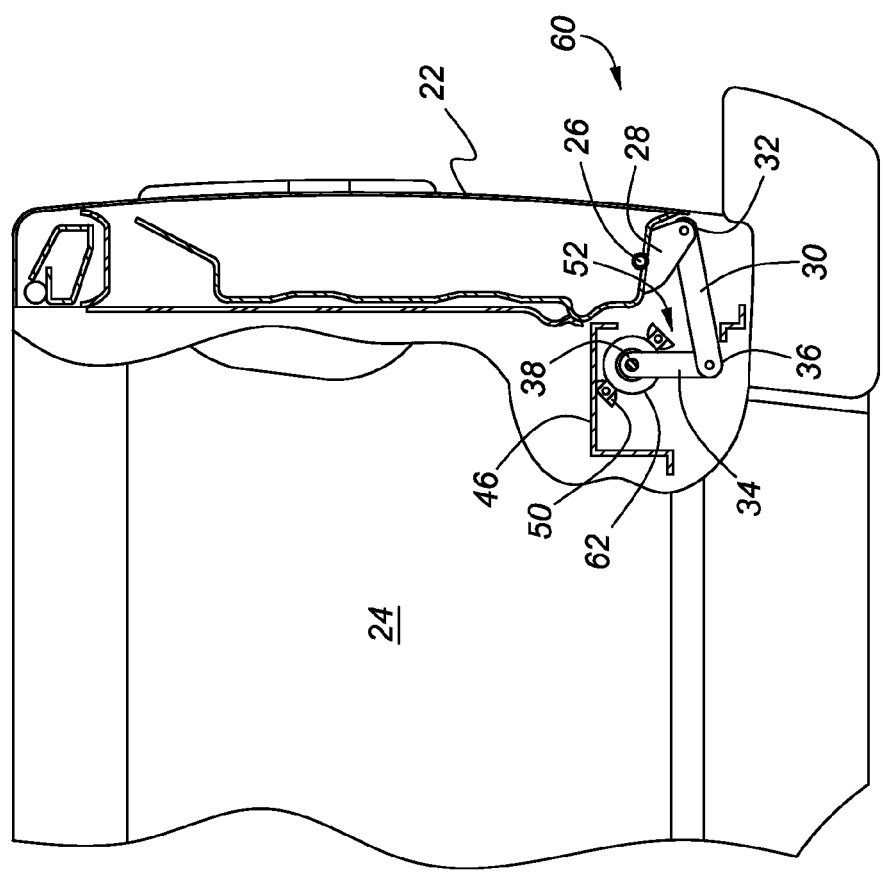
FIG. 8 is a side cutout view illustrative of another embodiment of a vehicle tailgate movement assist mechanism according to the present invention, illustrating the tailgate in a closed position.

Specifically, with tailgate 22 disposed in its fully upright and closed position of FIG. 8, a user may unlatch tailgate 22 in a known manner and pull tailgate 22 in the clock-wise direction in FIG. 8. As the user allows tailgate 22 to drop under its weight relative to pivot point 26, lever arm 28 may rotate in a clock-wise direction along with tailgate 22 to translate drive link 30 toward the left, which further rotates bell crank 34 in a clock-wise direction to actuate rotary damper 62. As tailgate 22 continues its clock-wise rotation about its pivot point 26 from the FIG. 8 to the FIG. 9 positions, actuation of the damping function of rotary damper 44 thus bring tailgate 22 to a "soft" stop as shown in FIG. 10. Moreover, if needed, the entire rotation of tailgate 22 from its closed position of FIG. 8 to its opened position of FIG. 10 may be controlled by means of the damping characteristics of rotary damper 62.

Figure 10:
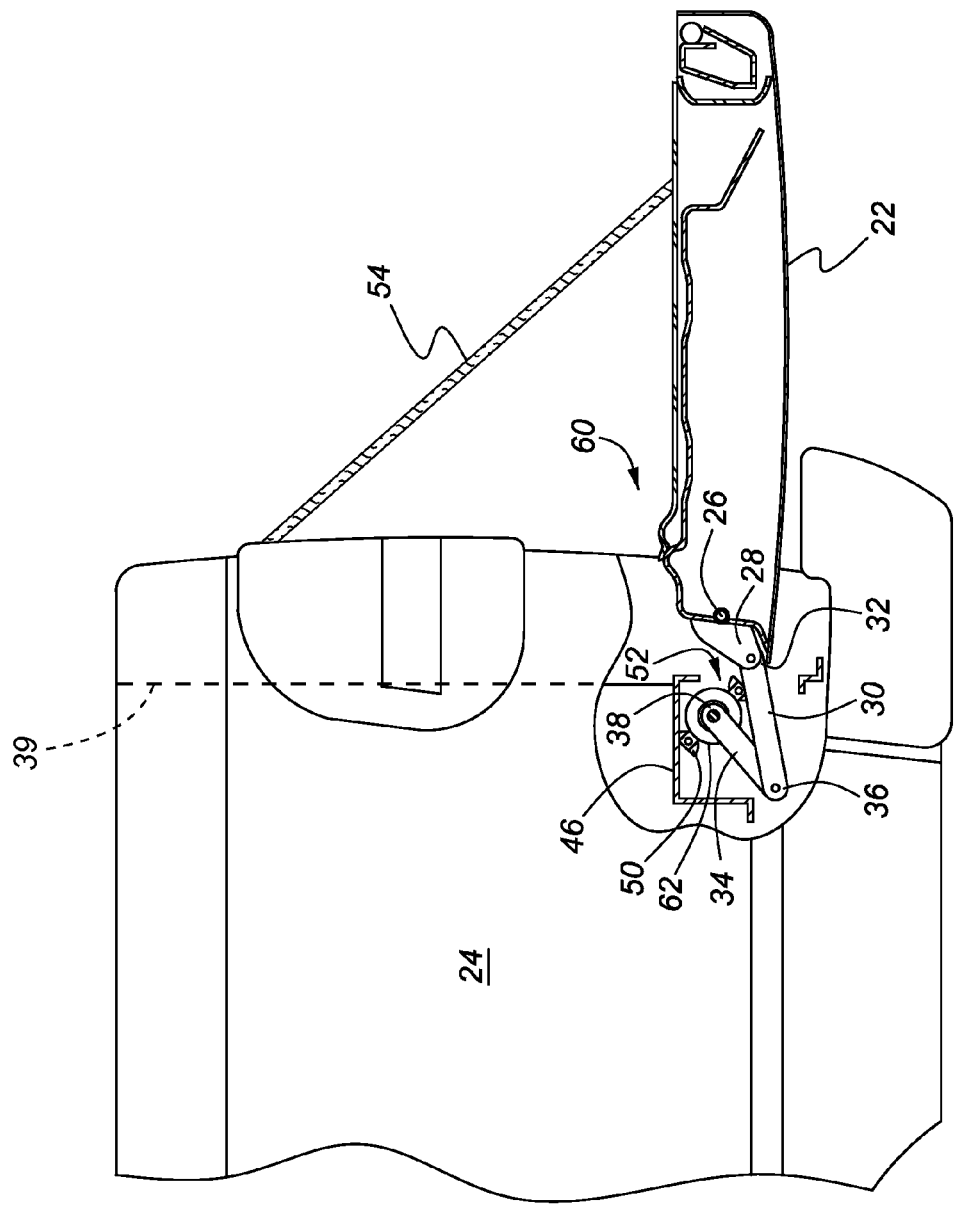
FIG. 10 is a side cutout view illustrative of the vehicle tailgate movement assist mechanism of FIG. 8, illustrating the tailgate in a fully open position.
Figure 10A:
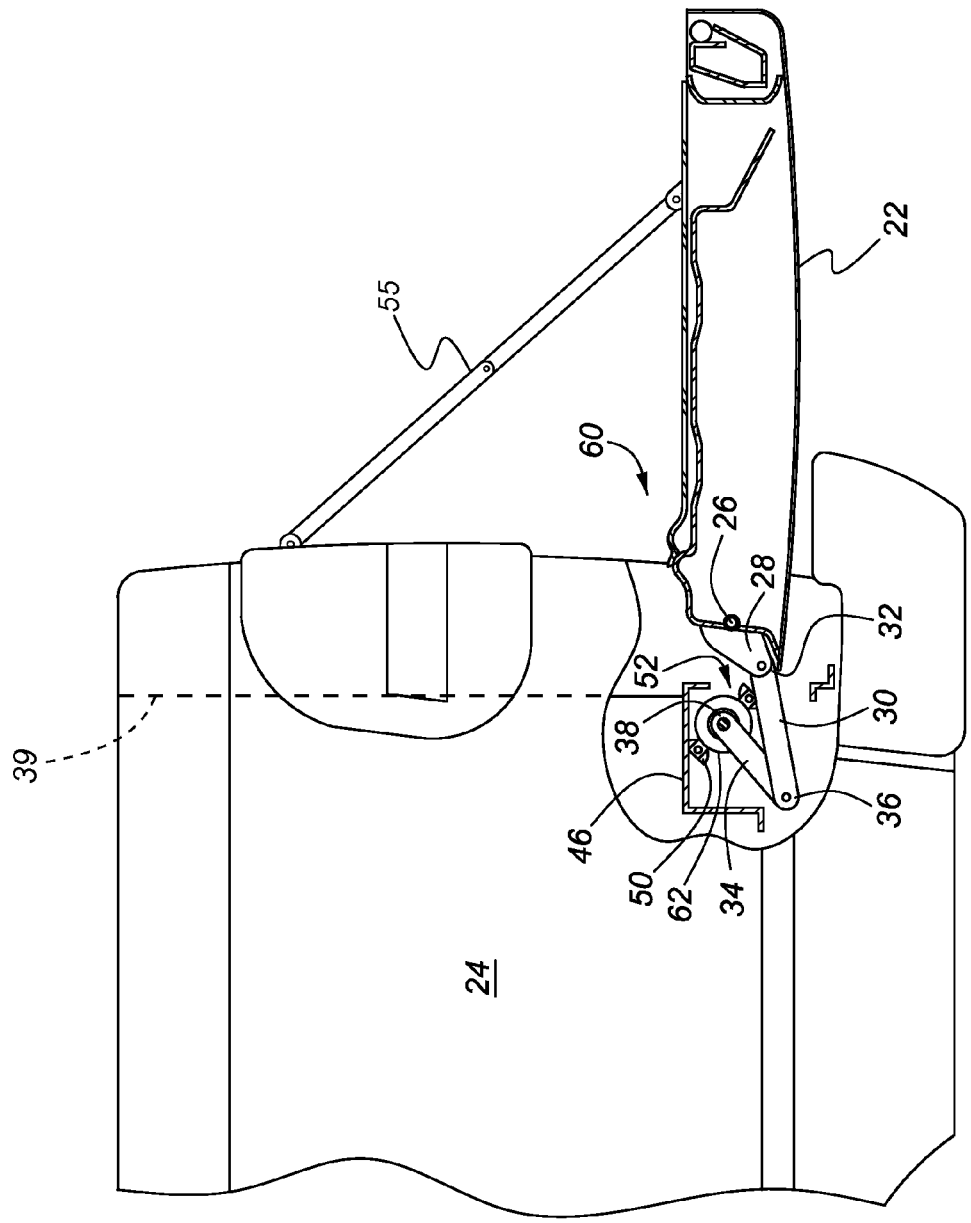
FIG. 10A is a side cutout view illustrative of the vehicle tailgate movement assist mechanism of the tailgate supported in a fully open position by a tailgate pivot bracket.

When tailgate 22 is lifted (i.e. rotated in a counter clockwise direction in the FIG. 10 configuration) from its fully open position of FIG. 10 to its fully closed position of FIG. 8, rotary damper 62 may likewise actuate to assist the user with lifting and thereafter full closing of the tailgate. As discussed above with reference to the opening function of tailgate 22, the entire rotation of tailgate 22 from its opened position of FIG. 10 to its closed position of FIG. 8 may be controlled or assisted by means of rotary damper 62.

Figure 2:
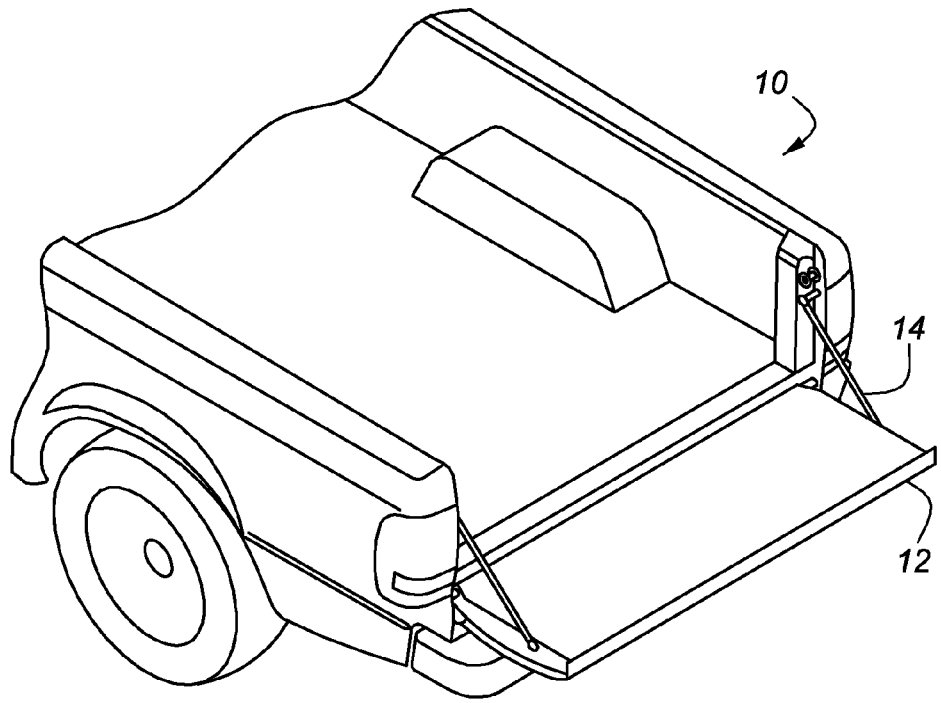
FIG. 2 is an isometric view of the pick up truck of FIG. 1, including the conventional tailgate pivot control mechanism, with the tailgate disposed in an open configuration.

As briefly discussed above, compared to conventional tailgate pivot control mechanisms such as the mechanisms illustrated in FIGS. 1 and 2, and the mechanisms disclosed in U.S. Pat. No. 6,773,047 to Gruber and U.S. Pat. No. 5,271,652 to Watanabe, the present invention tailgate movement assist mechanisms 20, 60 may be located anywhere along the bottom of tailgate 22 due to their minimal packaging requirements. For example, as also discussed above, as illustrated in FIGS. 4 and 5 of 6ruber, the 6ruber tailgate lift system includes a relatively long energy storage device (10) and similarly long bellcrank arm (13), with device (10) being pivotally mounted to the side wall in the D-pillar 39 area. The relatively long size of device (10) and bellcrank arm (13) require these components to be installed in the D-pillar area, which is itself limited in space due to the structural rigidity and performance requirements for this area. Since energy storage device (10) provides the primary force for assisting with movement of tailgate (2), adjustability in the opening or closing movement of tailgate (2) is limited to the operational parameters of device (10), which as discussed above, can itself in conjunction with bellcrank arm (13) be a design drawback due to the large size thereof. Further, since the primary focus in the D-pillar area is on the structural rigidity and performance of this area, the Gruber tailgate lift system must operate in a limited area, which can compromise the overall performance of the Gruber system.

Yet further, compared to conventional tailgate pivot control mechanisms such as the mechanisms illustrated in FIGS. 1 and 2, and the mechanisms disclosed in U.S. Pat. No. 6,773,047 to Gruber and U.S. Pat. No. 5,271,652 to Watanabe, as briefly discussed above, the present invention tailgate movement assist mechanisms 20, 60 may be readily tuned by simply changing the geometry of tailgate lever arm 28, drive link 30 and/or bell crank 34.

Those skilled in the art would readily appreciate in view of this disclosure that various modifications could be made to tailgate movement assist mechanisms 20, 60 described above, without departing from the scope of the present invention. For example, the geometry of tailgate lever arm 28, drive link 30 and bell crank 34 may be tailored to a particular application to provide the required travel, velocity, and mechanical advantage profiles as mechanisms 20, 60 articulate thru the opening and closing travel of the tailgate. Further, referring to FIG. 7, mechanisms 20, 60 may be used in the area of cutouts 52 at the left and right side of the sill, or a single mechanism may be used at a central location along the sill or at another suitable location along the sill.

Figure 11:
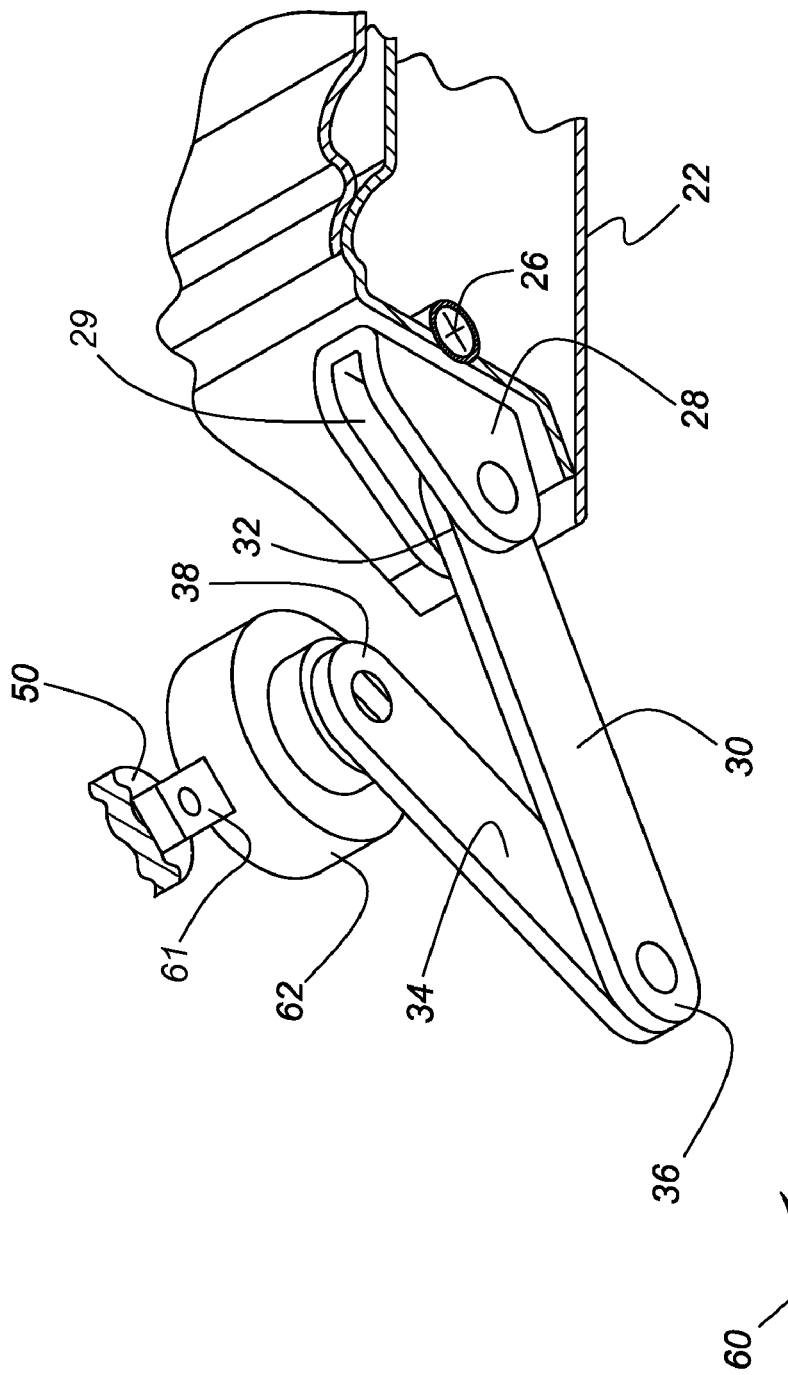
FIG. 11 is an isometric view of the components of the vehicle tailgate movement assist mechanism of FIG. 8.

Yet further, the components of tailgate movement assist mechanisms 20, 60 may be configured as needed based on the operational and packaging requirements of a particular vehicle. For example, as shown in FIGS. 6 and 11, tailgate lever arm 28 may include a u-shaped connection 29 for insertion of drive link 30 and retention therein by a pivot pin or similar nut/bolt type assembly. Drive link 30 and bell crank 34 may be pivotally connected to each other by similar pivot pin or nut/bolt type assemblies, and include bearings and other assembly components as needed as would be readily evident to those skilled in the art. Whereas two gears 40, 42 are illustrated in the embodiment for mechanism 20, a gear train may be provided as needed for adequate operation of mechanism 20, based on packaging, tuning and other mechanical advantages related to modification of the gear ratio.

Moreover, with mechanisms 20, 60 configured as discussed, as explained in detail above, for mechanism 20, rotation of the tailgate from a closed to an opened position simultaneously rotates the tailgate lever arm to impart movement to the drive lever and the bell crank to thereby rotate the rotary gear which rotates the damper gear, and movement of the tailgate, the tailgate lever arm, the drive lever, the bell crank, the rotary gear and/or the damper gear may directly or indirectly cause actuation of the rotary damper to reduce an opening speed of the tailgate. Further, rotation of the tailgate from an opened to a closed position simultaneously rotates the tailgate lever arm to impart movement to the drive lever and the bell crank to thereby rotate the rotary gear which rotates the damper gear, and movement of the tailgate, the tailgate lever arm, the drive lever, the bell crank, the rotary gear and/or the damper gear may directly or indirectly cause actuation of the rotary damper to assist with closing of the tailgate. For mechanism 60, rotation of the tailgate from a closed to an opened position simultaneously rotates the tailgate lever arm to impart movement to the drive lever and the bell crank, and movement of the tailgate, the tailgate lever arm, the drive lever and/or the bell crank may directly or indirectly cause actuation of the rotary damper to reduce an opening speed of the tailgate. Further, rotation of the tailgate from an opened to a closed position simultaneously rotates the tailgate lever arm to impart movement to the drive lever and the bell crank, and movement of the tailgate, the tailgate lever arm, the drive lever and/or the bell crank may directly or indirectly cause actuation of the rotary damper to assist with closing of the tailgate. In this regard, a control device 61 (i.e. an actuator, trigger, movement sensor etc.) may be mounted at a suitable location on the rotary damper or away from the rotary damper, respectively, such that movement of the aforementioned components directly or indirectly causes actuation of the rotary damper as needed.

To summarize, referring to FIGS. 3-11, the present invention thus provides vehicle tailgate movement assist mechanisms 20, 60 which may be installed adjacent the vehicle D-pillar 39, or along the width of the vehicle bed, without significantly impacting the space required for other structural components, or without being visible to a user due to their installation generally within the vehicle rear sill and at the bottom area of the tailgate. As discussed above, mechanisms 20, 60 are also capable of being readily tuned and adjusted to a users operational parameters, and include a minimal number of components for thus simplifying the manufacturing and assembly steps required for such components. Further, if tailgate 22 is inadvertently left in an open position during movement of the vehicle, the operational engagement of tailgate lever arm 28, drive link 30, bell crank 34 and rotary damper 44 (or 62) functions to reduce uncontrolled movement of the tailgate. Moreover, when rotary dampers 44, 62 are configured for providing lift assist for tailgate 22, mechanisms 20, 60 can provide for the possible elimination or reduction in the size and force of conventional lift assist springs or torsion rods, or tuning for higher optioned tailgates, for example with internal, deployable steps.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A vehicle tailgate movement assist mechanism comprising:
   a tailgate configured to rotate between opened and closed positions;
   a tailgate lever arm fixedly connected to a bottom area of the tailgate; and
   a drive link pivotally connected at one end thereof to said tailgate lever arm and pivotally connected at an opposite end thereof to a bell crank, said bell crank being connected to a shaft of a rotary damper anchored to a vehicle body,
   wherein rotation of the tailgate from a closed to an opened position simultaneously rotates said tailgate lever arm to impart movement to said drive link and said bell crank to thereby actuate said rotary damper to reduce an opening speed of the tailgate.

2. A vehicle tailgate movement assist mechanism according to claim 1, wherein rotation of the tailgate from an opened to a closed position simultaneously rotates said tailgate lever arm to impart movement to said drive link and said bell crank to thereby actuate said rotary damper to assist with closing of the tailgate.

3. A vehicle tailgate movement assist mechanism according to claim 1, wherein said rotary damper is anchored to a vehicle rear sill.

4. A vehicle tailgate movement assist mechanism according to claim 3, wherein said mechanism partially protrudes through a cutout in the vehicle rear sill.

5. A vehicle tailgate movement assist mechanism according to claim 1, wherein said mechanism is disposed adjacent a vehicle D-pillar.

6. A vehicle tailgate movement assist mechanism according to claim 1, wherein said mechanism is disposed at an intermediate location along a width of the tailgate.

7. A vehicle tailgate movement assist mechanism according to claim 1, wherein at least one of said drive link, bell crank, and rotary damper is disposed generally within a vehicle rear sill.

8. A vehicle tailgate movement assist mechanism according to claim 1, wherein movement of at least one of said tailgate, said tailgate lever arm, said drive link, and said bell crank directly or indirectly causes actuation of said rotary damper.

9. A vehicle tailgate movement assist mechanism according to claim 8, further comprising:
   a control device operably coupled with the rotary damper and adapted to monitor movement of at least one of said tailgate, said tailgate lever arm, said drive link, and said bell crank and actuate the rotary damper upon movement of at least one of said tailgate, said tailgate lever arm, said drive link, and said bell crank.

10. A vehicle tailgate movement assist mechanism according to claim 1, wherein the tailgate movement assist mechanism is disposed between sidewalls of the vehicle body.

11. A vehicle tailgate movement assist mechanism according to claim 1, wherein the rotary damper includes a torsion rod that provides lift assistance during closure of the tailgate.

12. A vehicle tailgate movement assist mechanism according to claim 11, wherein the torsion rod is disposed inside the rotary damper.

13. A vehicle tailgate movement assist mechanism according to claim 1, wherein the movement of the tailgate is at least partially restricted from further rotation when in the open position by one of a cable or tailgate pivot bracket.

14. A vehicle tailgate movement assist mechanism according to claim 1, wherein the tailgate lever arm includes a U-shaped connection for attachment with said drive link.

15. A vehicle tailgate movement assist mechanism according to claim 1, wherein said tailgate includes internal deployable steps.

* * * * *